March 2, 1971   K. PENNYCUICK ET AL   3,566,596
MANUFACTURE OF WIRE ROPES OR STRANDS
Filed Aug. 12, 1968   6 Sheets-Sheet 1

INVENTORS
KENNETH PENNYCUICK
PHILIP CHRISTIAN
ATTORNEYS

March 2, 1971  K. PENNYCUICK ET AL  3,566,596
MANUFACTURE OF WIRE ROPES OR STRANDS
Filed Aug. 12, 1968  6 Sheets-Sheet 3

INVENTORS
KENNETH PENNYCUICK
PHILIP CHRISTIAN

ATTORNEYS

March 2, 1971     K. PENNYCUICK ET AL     3,566,596
MANUFACTURE OF WIRE ROPES OR STRANDS
Filed Aug. 12, 1968     6 Sheets-Sheet 4

INVENTORS
KENNETH PENNYCUICK
PHILIP CHRISTIAN

ATTORNEYS

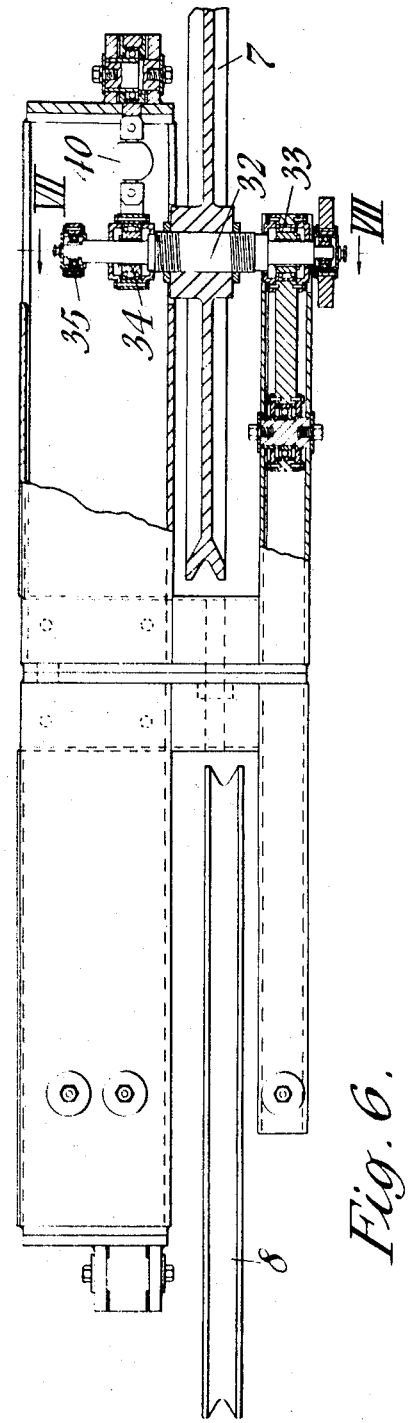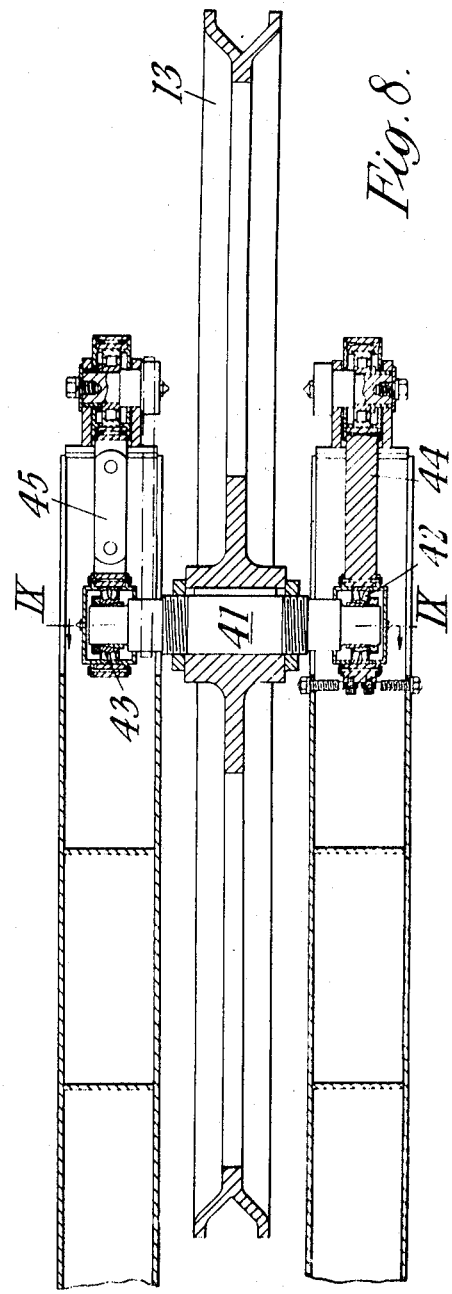

United States Patent Office 3,566,596
Patented Mar. 2, 1971

3,566,596
MANUFACTURE OF WIRE ROPES OR STRANDS
Kenneth Pennycuick, Northill Grange, near Biggleswade, and Philip Christian, Balby, Doncaster, England, assignors to British Ropes Limited, Doncaster, England
Filed Aug. 12, 1968, Ser. No. 751,918
Int. Cl. D07b 3/06, 7/10
U.S. Cl. 57—6                                11 Claims

ABSTRACT OF THE DISCLOSURE

In the manufacture of wire ropes, particularly locked coil ropes, wherein a layer of wires or strands is twisted onto a core, which may be constituted by an inner core covered with one or more previous layers of wires in strands, the improvement is made of continuously measuring the back tension and torque in the core immediately ahead of the twisting step. Continuous quality control is thus obtained and if the values deviate unduly, connections may be applied, either automatically or manually. The invention comprises both apparatus and method.

---

This invention relates to the manufacture of wire ropes and strands, and more particularly, but not solely, to the manufacture of locked coil wire ropes.

Locked coil wire ropes frequently have a tendency to waviness, i.e. a looseness and subsequent movement of the outer cover of wires. This fault can on occasion be traced to lack of balance between the residual torques in the wires making up the rope. By proper control of the torques on the cores during manufacture, the residual torques can be maintained in desired relationships with each other and the faults due to lack of balance between the torques can be eliminated or reduced to tolerable proportions.

The term core as used herein is intended to imply either the core strand itself or the partly completed rope onto which a layer of wires or strands is being twisted.

By maintaining correct relationship between the torque and back tension at each stage, in conjunction with suitable values of other manufacturing parameters, the required torque balance may be achieved.

The object of achieving such torque balance is to ensure that a rope on leaving the rope making machine is free from any inherent tendency to rotate as it is released from the machine.

Similar considerations apply to other wire ropes and the present invention is to be regarded as extending, so far as it is applicable, to the manufacture of all types of wire ropes or strands.

Accordingly the invention consists in a method of testing a wire rope during manufacture comprising measuring the back tension and torque in a core just before a layer of wires or strands is twisted thereonto.

By providing suitable arrangements, such as a back tension cradle also adapted to rotate about an axis parallel with the direction of feed of the rope or strand, the back tension and torque on the rope or strand can be regulated to maintain them at the desired values.

The invention further consists in a method of twisting a layer of wires or strands onto a core in which the back tension and torque in the core are continuously measured just before the layer is twisted on and the back tension and torque are controlled to maintain them at or near a desired value.

The control may be automatically applied, or may be applied by an operator.

The invention still further consists in a wire rope or strand made by a method as set forth above.

The invention still further consists in apparatus for twisting a layer of wires or strands onto a core comprising means for twisting the layer onto the core as the latter is fed through, means for continuously measuring the torque and back tension in the core just before the layer is twisted on and means for controlling the torque and back tension in the core.

Preferably, the torque measuring means includes a pair of torque wheels over which the core is passed, the wheels being mounted on linkages including load cells for measuring the couple applied to the wheels by the core. One wheel measures the torque in the core leaving the rear reel and the other the torque on the core as the layer is twisted thereon. This may differ from the earlier torque and two measurements are taken to ensure that a value unaffected by the torque arising during the stage is measured.

Conveniently, the wheel support linkages also include load cells for measuring the back tension in the core.

In a preferred form of the invention the covered core may pass over further means, e.g. a torque wheel mounted on load cells, for measuring the torque and tension in the covered core emerging from a shaping die.

In addition the die may be mounted so that the force thereon may be measured.

The invention will be further described with reference to the drawings accompanying the provisional specification, which show a preferred embodiment of apparatus according to the invention, and in which:

FIG. 4 is a side elevation of a torque and tension measuring device forming part of the apparatus of FIG. 1;

FIG. 6 is a plan view, to a larger scale and partly in horizontal section, of part of the device of FIGS. 4 and 5;

FIG. 8 is a horizontal section of a torque and tension measuring device for the rope or strand leaving the apparatus of FIG. 1;

Figure 1:
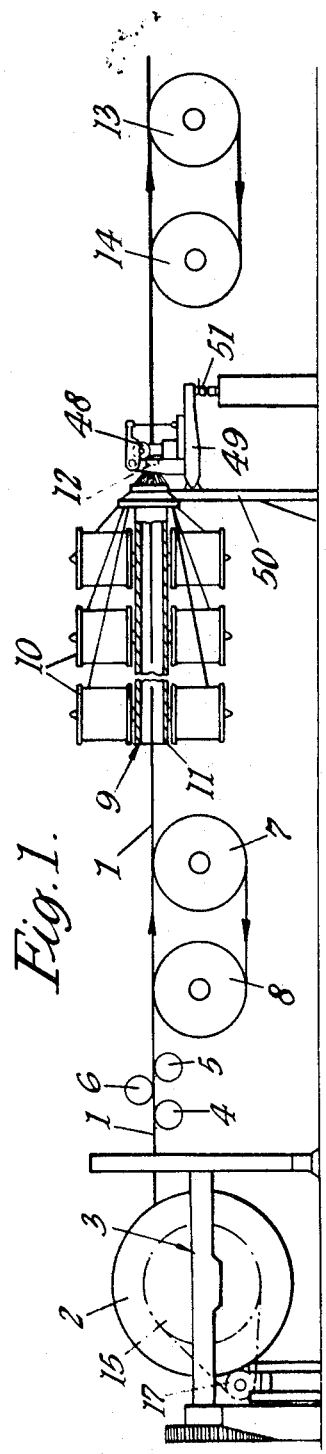
FIG. 1 is a diagrammatic view of apparatus for twisting a layer of wires onto a core according to one form of the invention.

Referring first to FIG. 1 of the drawings, the core 1, which may consist either of a core strand alone or of a core strand with one or more layers of wires or strands already in position, is unreeled from a drum 2 mounted on a back twist cradle 3, whence it passes over a set of guide rollers 4, 5, 6 and over first and second torque measuring wheels 7 and 8. A rotatable cradle 9 carries a plurality of bobbins 10 of wire to be twisted on to the core 1 and the core 1 passes through a hollow shaft 11 forming part of the cradle 9 for the wires to be twisted on as it emerges. After the wires have been twisted on to the core the core and wires are passed through a shaping die 12 and over a further torque measuring wheel 13 and a capstan 14 and then on to a take up reel not shown.

FIGS. 2 to 10 show in more detail certain of the parts illustrated in FIG. 1 which are departures from standard practice.

Figure 2:
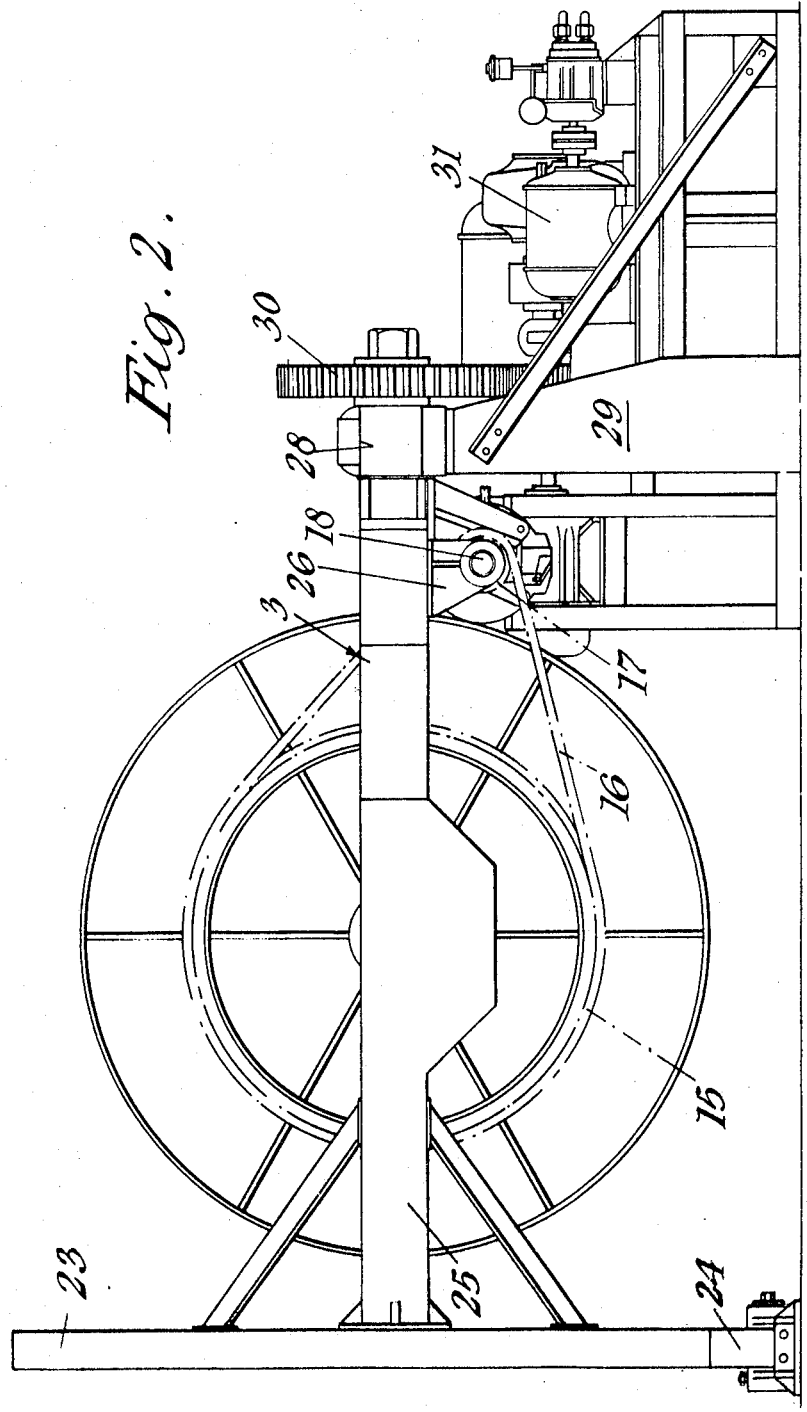
FIG. 2 is a side elevation of a back twist cradle forming part of the apparatus of FIG. 1.
Figure 3:
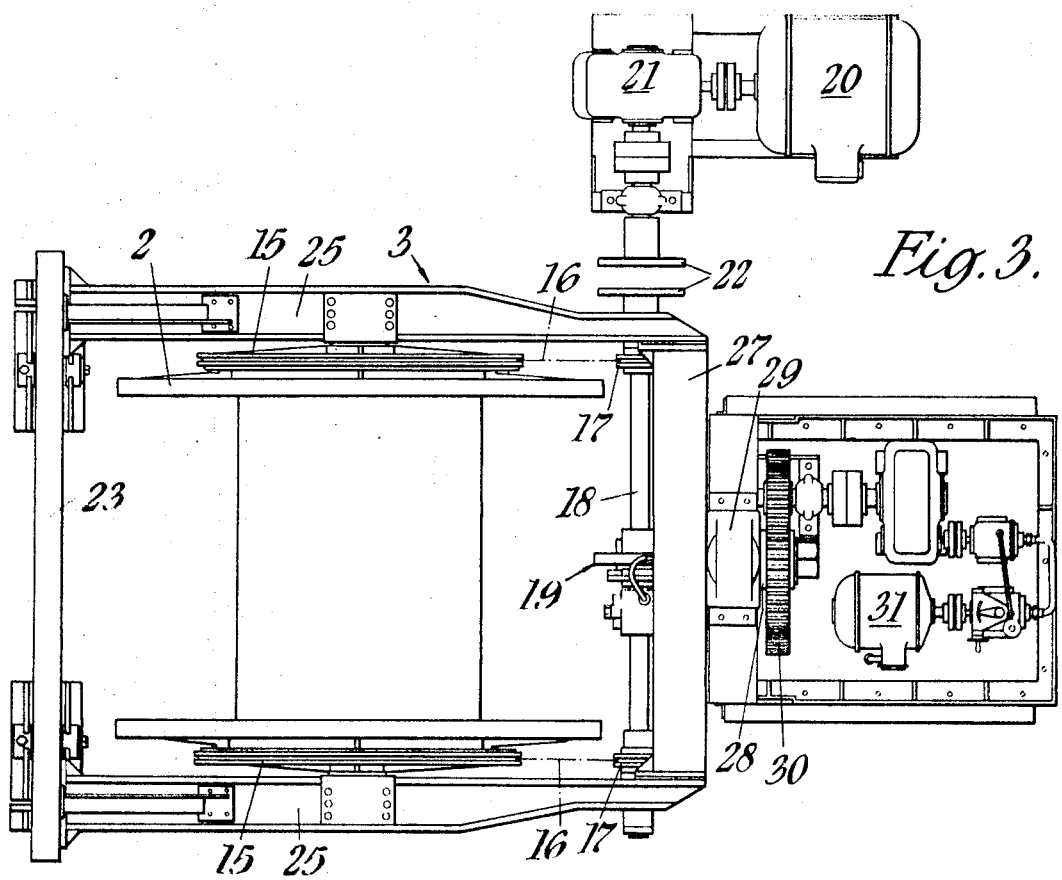
FIG. 3 is a plan view of the cradle shown in FIG. 2.

FIGS. 2 and 3 show in more detail a form of the back twist cradle 3 and drum 2. Rigid with the drum are a pair of large chain wheels 15 connected by chains 16 to small chain wheels 17 on a cross shaft 18. The cross shaft 18 has a disc brake 19 thereon which is adapted to be applied with controlled variable pressure to provide controlled back tension in the core leaving the drum 2.

In one position of the cradle the shaft 18 is also adapted to be driven by means of a motor 20 through a reduction gearing 21 and a releasable coupling 22 so that the drum may be driven to wind up the core or rope. The cradle 3 comprises a rear circular frame member 23, supported on rollers 24, and a pair of side frame members 25 containing the drum bearings and supporting brackets 26 for the bearings of shaft 18. A front frame member 27 interconnects the side frame members 25 and carries a shaft 28 journalled in fixed frame member 29 and supporting the gear wheel 30 adapted to be driven by a motor 31 through a suitable reduction gearing, at varying speeds, under the control of an operator or automatically, whereby a desired amount of turn may be put into the core to achieve the desired torques. The control is normally by way of adjustment dependent on whether the readings given by torque measuring wheels 7 and 8 are above or below the required values.

FIGS. 4 to 7 show the torque measuring wheels 7 and 8 in more detail and it will also be understood that these torque measuring wheels are also arranged to give a reading of the back tension in the core 1. The guide roller assembly 4, 5, 6 is designed to ensure that the core is presented to the first torque measuring wheel 7 at the same position in order that the measurements may be consistent and it will be noted that the wheels 7 and 8 have their axes slightly skewed in order that the core may run freely over the top and half round wheel 7 and beneath and half round wheel 8. It will be seen particularly from FIGS. 6 and 7 that the wheels 7 and 8 are keyed to shafts 32 which are supported in bearings 33, 34 and 35 which are upwardly urged by springs 36, 37, 38.

Torque on the core 1 tends to rotate the measuring wheels about axes perpendicular to the axes of the shafts 32 and parallel with the path of the core and this tendency is measured by a load cell 39, the readings from which may be so calibrated as to provide a direct reading of torque in the core.

The bearings 33 and 34 are also longitudinally supported and one of the supporting links for each wheel contains a load cell 40 which absorbs and measures the tensional force imparted by the core to the torque measuring wheel. Again the readings may be calibrated directly into back tension in the core.

The readings from the load cells 39 and load cells 40 provide the machine operator, or an automatically controlled arrangement, information on which the setting of the controls of the brake 19 and motor 31 of the back twist cradle 3 can be based for optimum control of the back tension and torque in the core.

Figure 9:
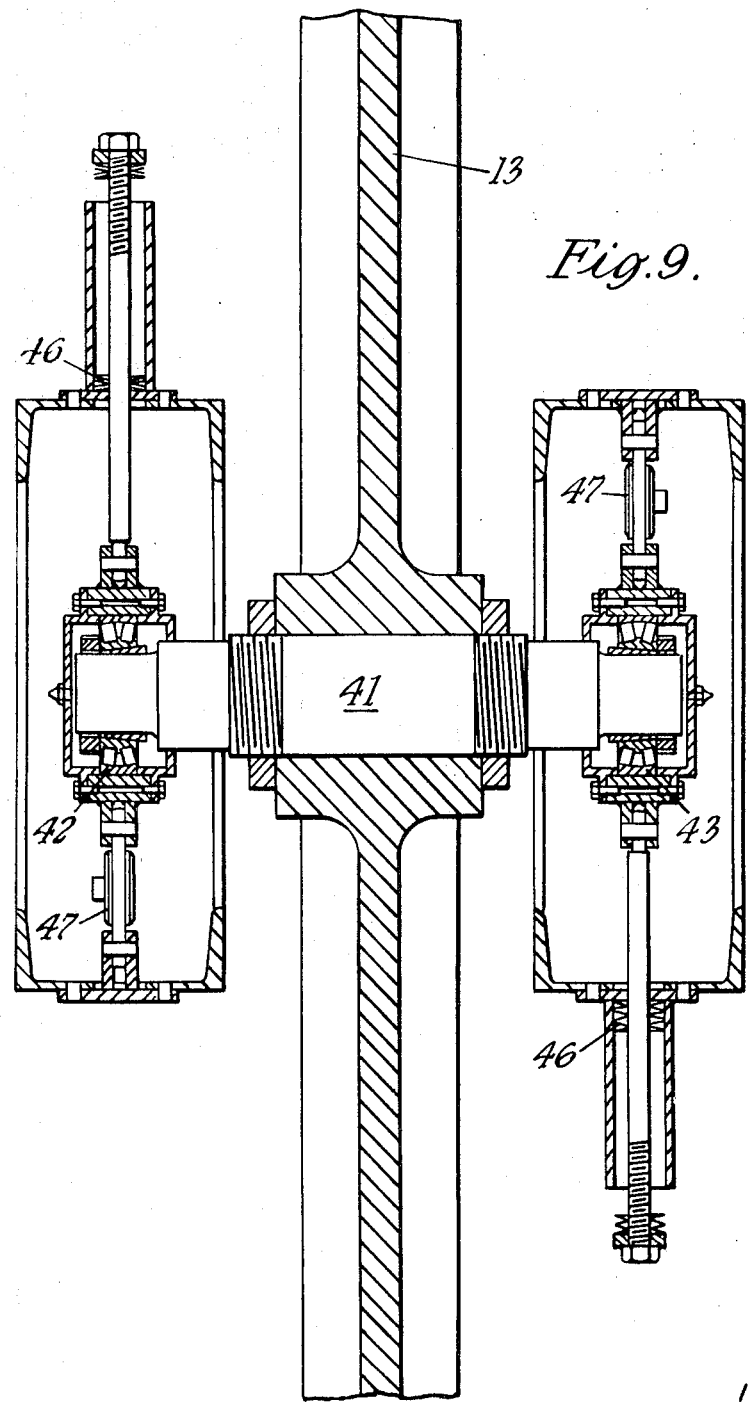
FIG. 9 is a section on the line IX—IX of FIG. 8.

FIGS. 8 and 9 illustrate the single torque measuring wheel 13 which measures the torque in the covered core. It is basically similar to the wheels 7 and 8 but incorporates a number of modifications, which could be also incorporated in the wheels 7 and 8 if desired. In this case the wheel 13 is keyed to a shaft 41 supported in two bearings 42, 43, which are longitudinally supported by a solid link 44 and a link including a load cell 45 to provide a reading of tension. The bearings are vertically supported by stacks 46 of disc springs and by links including load cells 47 so that two opposite readings of tension are obtained and weight effects are cancelled out.

Figure 10:
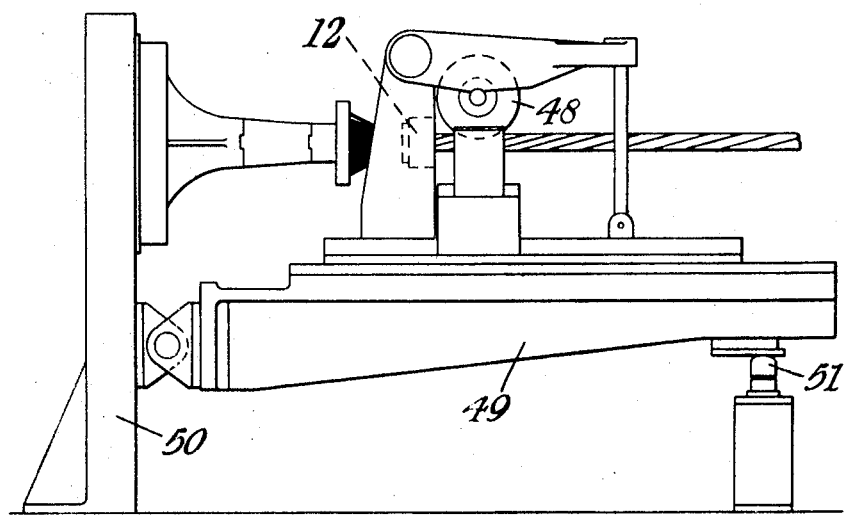
FIG. 10 is a side elevation of a die force measuring unit forming part of the apparatus of FIG. 1.
Figure 7:
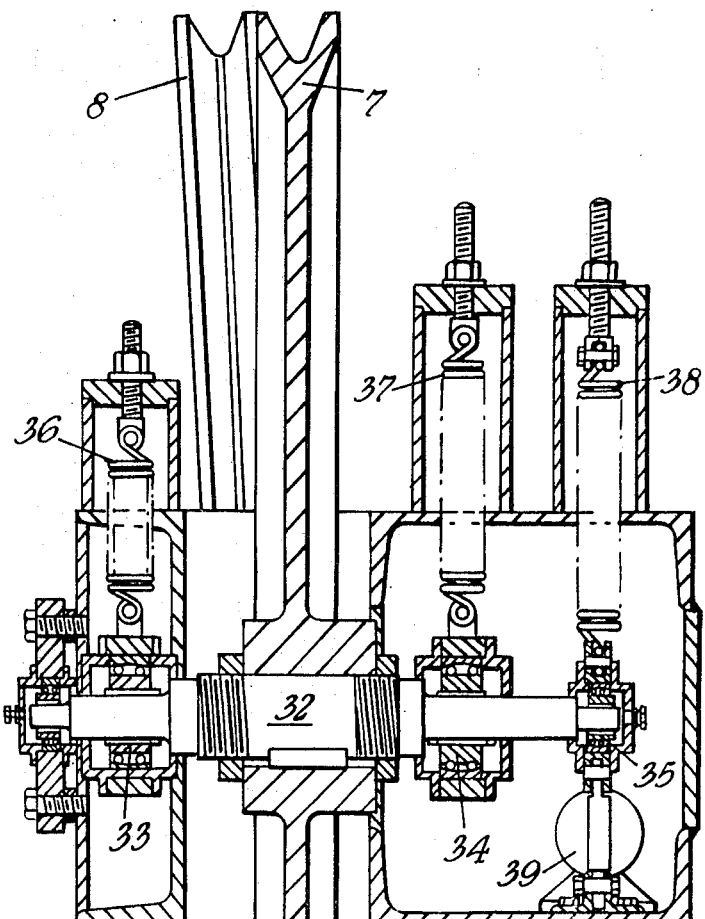
FIG. 7 is a section on the line VII—VII of FIG. 6.
Figure 5:
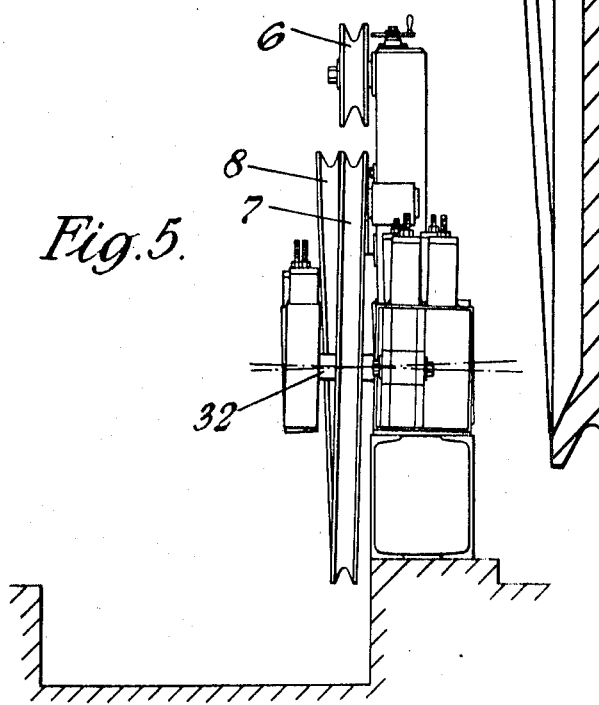
FIG. 5 is an end elevation of the device of FIG. 4.

FIG. 10 shows a shaping die 12 and a sizing roller 48 mounted on a platform 49 pivotally mounted on fixed frame member 50 and supported by a load cell 51 giving a reading dependent upon the tensional forces absorbed by the die and sizing roller. By proper use of the information provided by the various load cells inserted in the apparatus the quality of the rope can be controlled minutely at every stage of manufacture and this feature is of very great importance both for experimental work with new forms of rope and also in production of new and old types of rope.

We claim:
1. In the method of manufacture of wire rope by twisting at least one layer of wires or strands onto a core the improvement which consists in measuring continuously the back tension and torque in the core just before the layer of wires or strands is twisted on.

2. The method as claimed in claim 1, further comprising the steps of controlling the back tension and torque to maintain them close to desired values.

3. The method as claimed in claim 1, in which the measurements are effected by means of load cells.

4. The method as claimed in claim 1, in which the core and layer are shaped in a shaping die and the torque and tension in the resulting wire rope are measured downstream of the shaping operation.

5. In apparatus for the manufacture of wire rope comprising means for feeding a core, and means for twisting a layer of wires or strands onto the core as it is fed through: the improvement of means for continuously measuring the torque and back tension in the core immediately before the layer is twisted on, and means for controlling the torque and back tension in the core.

6. Apparatus as claimed in claim 5, in which the torque measuring means comprises a pair of torque wheels over which the core is passed before the layer is twisted on, support linkages of the torque wheels, and load cells forming part of the support linkages for measuring the couple applied to the torque wheels by the core.

7. Apparatus as claimed in claim 6, in which the support linkages also include further load cells for measuring the back tension in the core.

8. Apparatus as claimed in claim 5, further comprising a shaping die for shaping the core and layer after the twisting on of the layer, and further means for measuring the torque and tension in the covered core emerging from the die.

9. Apparatus as claimed in claim 8, in which the said further means includes a torque wheel and load cells on which the said last mentioned torque wheel is mounted.

10. Apparatus as claimed in claim 8, comprising means for measuring the tensional forces absorbed in the die.

11. Apparatus as claimed in claim 5, in which the means for controlling the torque and back tension in the core includes a back twist cradle and a feeding drum for the core, the drum being mounted in the cradle.

References Cited
UNITED STATES PATENTS

| | | | |
|---|---|---|---|
| 2,706,376 | 4/1955 | Kerr | 57—6 |
| 3,058,867 | 10/1962 | Plumber et al. | 57—6 |
| 3,162,992 | 12/1964 | Davis et al. | 57—6 |
| 3,388,543 | 6/1968 | Downton | 57—166 |

DONALD E. WATKINS, Primary Examiner

U.S. Cl. X.R.

57—166; 73—95.5, 158